United States Patent

Ishi

[11] Patent Number: 5,867,786
[45] Date of Patent: Feb. 2, 1999

[54] SYSTEM FOR MONITORING CARRIERS OF PERIPHERAL ZONES

[75] Inventor: Haruhiko Ishi, Kawasaki, Japan

[73] Assignee: Fujitsu Limited, Kanagawa, Japan

[21] Appl. No.: 929,999

[22] Filed: Sep. 15, 1997

Related U.S. Application Data

[63] Continuation of Ser. No. 336,535, Nov. 9, 1994, abandoned.

[30] Foreign Application Priority Data

Apr. 15, 1994 [JP] Japan ..................................... 6-076910

[51] Int. Cl.⁶ ................................................... H04Q 7/00
[52] U.S. Cl. .......................................... 455/436; 455/524
[58] Field of Search .................... 455/436, 524, 455/62, 63

[56] References Cited

U.S. PATENT DOCUMENTS

| | | | |
|---|---|---|---|
| 5,008,953 | 4/1991 | Dahlin et al. ............................... | 379/60 |
| 5,125,105 | 6/1992 | Kennedy et al. ..................... | 455/164.1 |
| 5,239,675 | 8/1993 | Dudczak ................................. | 455/33.2 |
| 5,285,447 | 2/1994 | Hulsebosch ............................ | 455/33.2 |
| 5,471,670 | 11/1995 | Hess et al. .............................. | 455/33.2 |
| 5,506,869 | 4/1996 | Royer ........................................ | 379/60 |

FOREIGN PATENT DOCUMENTS

| | | |
|---|---|---|
| 1321739 | 12/1989 | Japan . |
| 555997 | 3/1993 | Japan . |

*Primary Examiner*—Reinhard J. Eisenzopf
*Assistant Examiner*—Marsha D. Banks-Harold
*Attorney, Agent, or Firm*—Helfgott & Karas, P.C.

[57] ABSTRACT

A system for monitoring carriers of peripheral zones in a mobile telecommunication system, wherein when monitoring the carriers transmitted from the base stations in peripheral zones, the mobile units deem transmissions carriers to be true carriers received from peripheral zones and monitor the same when the two conditions stand that the received field strengths of the transmission carriers are at least a certain level and that there is significant data transmitted by the transmission carriers. Due to this, the mobile units are prevented from erroneous channel switching or zone shifting due to interference or a transmission carrier from another zone which may be deemed interference.

20 Claims, 12 Drawing Sheets

Fig.6

| R | P | TCH (FACCH) | SW | CC | SF | SACCH (RCH) | TCH (FACCH) | G |

Fig.7

| R | P | TCH (FACCH) | SW | CC | SF | SACCH (RCH) | TCH (FACCH) |

Fig.10

| ELEMENTS OF INFORMATION | INFORMATION LENGTH (BITS) | NOTE | |
|---|---|---|---|
| MESSAGE CLASSIFICATION | 8 | REPORT OF RADIO STATUS | |
| RECEIVED LEVEL | 8 | RECEIVED LEVEL OF ENGAGED ZONE | )($f_A$) |
| NUMBER OF SELECTED ZONES (N) | 8 | | |
| IDENTIFICATION DATA OF BASE STATION | 16 | FIRST (MAXIMUM) RECEIVED LEVEL OF PERIPHERAL ZONE | )($f_1$) |
| RECEIVED LEVEL | 8 | 〃 | |
| IDENTIFICATION DATA OF BASE STATION | 16 | SECOND RECEIVED LEVEL OF PERIPHERAL ZONE | )($f_2$) |
| RECEIVED LEVEL | 8 | 〃 | |
| ⋮ | ⋮ | ⋮ | |
| IDENTIFICATION DATA OF BASE STATION | 16 | Nth RECEIVED LEVEL OF PERIPHERAL ZONE | )($f_N$) |
| RECEIVED LEVEL | 8 | 〃 | |

Fig.11

| ELEMETS OF INFORMATION | INFORMATION LENGTH (BITS) | NOTE | |
|---|---|---|---|
| MESSAGE CLASSIFICATION | 8 | REPORT OF RADIO STATUS | |
| RECEIVED LEVEL | 8 | RECEIVED LEVEL OF ENGAGING ZONE | ($f_A$) |
| NUMBER OF SELECTED ZONES (N) | 8 | | |
| PERCH CHANNEL NUMBER | 8 | FIRST(MAXIMUM) RECEIVED LEVEL OF PERIPHERAL ZONE | ($f_1$) |
| COLOR CODE | 8 | 〃 | |
| RECEIVED LEVEL | 8 | 〃 | |
| PERCH CHANNEL NUMBER | 8 | SECOND RECEIVED LEVEL OF PERIPHERAL ZONE | ($f_2$) |
| COLOR CODE | 8 | 〃 | |
| RECEIVED LEVEL | 8 | 〃 | |
| ⋮ | ⋮ | ⋮ | |
| PERCH CHANNEL NUMBER | 8 | Nth RECEIVED LEVEL OF PERIPHERAL ZONE | ($f_N$) |
| COLOR CODE | 8 | | |
| RECEIVED LEVEL | 8 | | |

SYSTEM FOR MONITORING CARRIERS OF PERIPHERAL ZONES

This is a continuation of application Ser. No. 08/336,535, filed Nov. 9, 1994, now abandoned.

BACKGROUND OF THE INVENTION

1. Field of the Invention

The present invention relates to a system for monitoring carriers of peripheral zones, more particularly relates to a system for monitoring carriers of peripheral zones in a mobile telecommunications system where an individual mobile unit communicates with several base stations.

2. Description of the Related Art

In recent years, there has been striking progress in car phones, cellular phones, and other digital mobile telecommunications systems. One of the themes of development has been the reduction of the radius of the service zones (cells). In general, a digital mobile telecommunications system is comprised by a radio communication network consisting of a close-knit honeycomb arrangement of plurality of grids of zones having exactly the same configuration, i.e., a configuration of a plurality of zones, for example seven, to which differing carrier frequencies have been allocated. To improve the efficiency of reuse of the carrier frequencies by the grids of zones, the trend in recent years, as mentioned earlier, has been to reduce the radius of the individual zones.

If the zone radius is reduced in this way, however, a mobile unit may keep on changing the zone it is engaged with, so the frequency of channel switching and zone shifting ends up increasing. Here, "channel switching" refers to the operation for switching the speech channel of a mobile unit from one of a base station in an engaged zone to one of the base station of another zone when a mobile unit involved in a call moves from one zone to an adjoining peripheral zone. The smaller the zone radius, the more frequent the channel switching. Further, "zone shifting" refers to the operation for switching the zone for line connection from one zone to another when a mobile unit in a radio communication network moves from its current line connection zone to an adjoining zone.

By reducing the zone radius, the base stations end up with a considerably heavier load in controlling the channel switching. Therefore, the practice has been to lighten the load by placing part of it on the mobile unit. That is, a mobile unit uses its unused slots (idle time) to monitor the carriers received from the peripheral zones around it and sends monitoring information to the engaged base station. The base station receiving this uses the information to determine to which zone the base station which the mobile unit should communicate with belongs and, if necessary, switches the channel from the engaged zone to an adjoining peripheral zone.

Since the base station switches channels using the monitoring information notified to it from the mobile unit under time division multiple access (TDMA) control, it is necessary that the mobile unit give the base station accurate monitoring information about the peripheral zones. If a mobile unit does not select the correct zone for line connection (3), it cannot originate or receive a call, so has to accurately recognize if the zone it shifts to is correct.

As will be explained in detail later referring to the figures, a mobile unit detects the received field strengths of the transmission carriers received at each idle time and, if engaged in a call, sends those values periodically to the nearest base station. When the level of reception from a peripheral base station becomes higher in the mobile unit than the level of reception from that original engaged base station, the original engaged base station switches the channel to one of the zone with the highest level of received field strength from the viewpoint of the mobile unit. When the mobile unit is in a waiting state where it is standing by to receive or send a call, it shifts the zone it is engaged with to that of the base station sending the carrier with the highest received field strength which it receives. The mobile unit subsequently can engage in normal communication.

That is, the base station checks that the level of the received field strength of the transmission carrier received by the mobile unit is the highest and switches the channel to one of the zone sending the transmission carrier. On the other hand, the mobile unit shifts the zone it is engaged with to the zone with the highest level of received field strength.

Assume here that there is a source of interference. Assume further that it radiates a relatively high level wave and that the frequency of the radiated wave is substantially equal to the frequency of a carrier sent from the engaged base station.

In such a situation, due to the reasons discussed later, the mobile unit sometimes cannot maintain communication with its current base station from which it receives a wave at a suitable received field strength.

On the other hand, when there are a number of other mobile unit close to the source of interference, these mobile units also try to switch channels or shift zones to the other base station with the same frequency, so there is the problem that the normal connection operation of that base station is disturbed.

Further, a mobile unit in a waiting state would receive the strong interference and switch channels to the same, but since that channel does not contain any data, it would then switch to the channel with the next highest received level. Since it again receives the interference, however, it again switches to that channel. While switching to that channel, it cannot originate or terminate calls, which poses a problem in system operation. The same applies to the other mobile units.

Note that the above problems may also occur due to factors other than a source of interference (explained later).

SUMMARY OF THE INVENTION

Accordingly, the present invention, in consideration of the above-mentioned problem, has as its object the provision of a system for monitoring carriers of peripheral zones which enables a mobile unit to perform channel switching or zone shifting free from the effect of any interference or any transmission carrier from another grid of zones which may be deemed interference even if receiving the same at a high received field strength.

To attain the above object, the present invention is comprised so that, when a mobile unit monitors carriers sent from base stations in peripheral zones, it monitors the received carriers only when the two conditions stand that the received field strength of the transmission carrier is above a certain level and there is significant data sent on the transmission carrier. Due to this, the mobile unit is prevented from erroneous channel switching or zone shifting due to interference or a transmission carrier from another zone which may be deemed interference.

BRIEF DESCRIPTION OF THE DRAWINGS

The above object and features of the present invention will be more apparent from the following description of the preferred embodiments with reference to the accompanying drawings, wherein:

FIG. 6 is a view of an example of the configuration of a speech channel sent from a mobile unit during a call;

FIG. 7 is a view of an example of the configuration of a speech channel sent from a base station during a call;

FIG. 10 is a view of an example of a report of radio status;

FIG. 11 is a view of a specific example of a report of radio status shown in FIG. 10;

DESCRIPTION OF THE PREFERRED EMBODIMENTS

Before describing the embodiments of the present invention, the related art and the disadvantages therein will be described with reference to the related figures.

Figure 14:
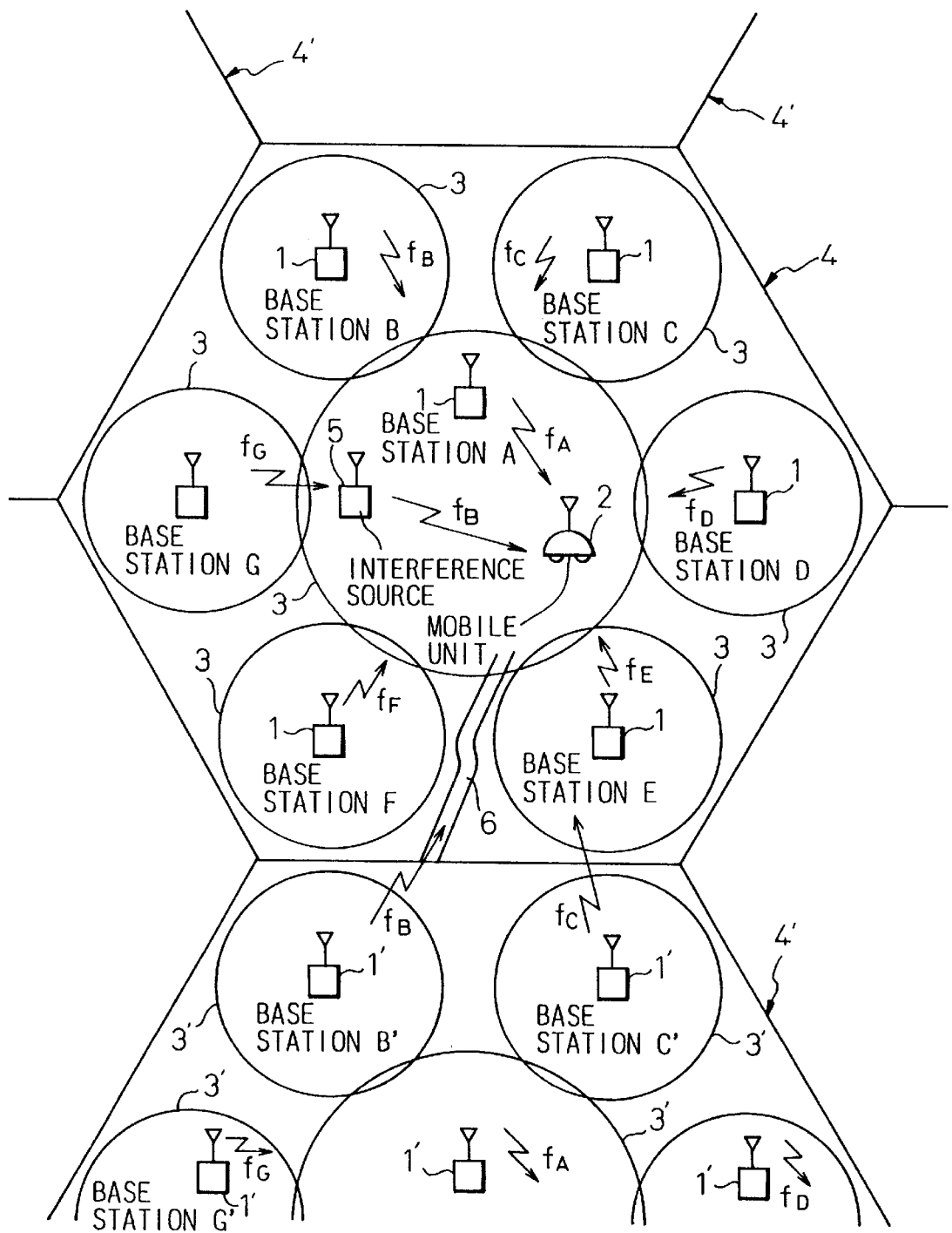
FIG. 14 is a view of an example of a general mobile telecommunications network.

FIG. 14 is a view of an example of a general mobile telecommunications network. In the figure, reference numerals 1 indicate base stations and 2 a mobile unit communicating with the nearest base station 1. Each base station (for example, the base station A, base station B, . . . base station G) 1 has its own service zone (frequency zone) 3. The group of zones 3 together form a single grid of zones 4. In the illustrated example, the mobile unit 2 is located in a zone 3 centered around the base station A. The grid of zones 4 including that zone 3 is therefore the grid of zones engaged with by the mobile unit 2.

Other grids of zones 4' of substantially the same configuration as the engaged grid of zones 4 exist around the engaged grid of zones 4. Accordingly, there are base stations (A', B', C' . . . G') 1' in the zones 3' in the other grids of zones 4' as well. Here, a group of frequencies the same as the frequencies $f_A, f_B \ldots f_G$ allocated to the zones in the grid of zones 4 is reused in each of the other grids of zones 4'. This is for making effective use of frequencies.

The mobile unit 2, as explained earlier, creates and sends to the nearest base station 1 monitoring information about the transmission carriers of peripheral zones. The mobile unit 2 receives the transmission carriers sent individually from the base stations 1 and monitors them using its unused slots (idle time) so as to produce this monitoring information.

More specifically, as explained above, the mobile unit 2 detects the received field strengths of the channels received at idle times from the peripheral base stations and, if involved in a call, sends those values periodically to the nearest base station. When the level of reception from a peripheral base station 1 becomes higher than the level of reception from the base station A at the mobile unit 2, the base station 1 switches the channel to the zone of the highest received field strength at the mobile unit 2. Further, when the mobile unit is in a waiting state where it is ready to start communications, it shifts the zone to the zone of the base station sending the carrier with the highest received field strength received by the mobile unit. It then is ready to begin a normal call.

As explained above, the base station 1 checks that the level of the received field strength of the transmission carrier received by the mobile unit 2 is the highest and switches the channel to the zone sending that transmission carrier. Further, the mobile unit 2 shifts the zone to the zone with the highest level of received field strength.

Referring here to FIG. 14 once again, assume that there is a source 5 of interference at the illustrated position. Assume further that it radiates a relatively high level wave and that the frequency of the radiated wave is substantially equal to the frequency of the carrier sent from a base station B in the engaged grid of zones 4. Note that the source 5 of the interference may for example be a high powered tranceiver etc. illegally modified by ham operator. It may also be a source of a test wave.

In such a situation, since the illustrated mobile unit 2 receives the high power interference ($f_B$), the base station A sends a command for channel switching to the base station B allocated the carrier frequency $f_B$, then commands the mobile unit 2 to switch channels to the base station B.

Receiving this command, the mobile unit 2 tries to start connection with the base station B by a predetermined protocol. The wave received by the mobile unit 2 and regarded as a transmission carrier from the base station B, however, is the above interference ($f_B$) and includes no data at all, so the protocol is not established. In the end the mobile unit fails to connect with the base station B. Therefore, the mobile unit 2 returns to the original base station A once again and resumes communication. The mobile unit 2, however, again receives the strong interference ($f_B$) and notifies this to the base station A, so once again tries to connect with the base station B.

In the end, the mobile unit 2 cannot maintain communication with the base station A despite receiving a wave at a suitable received field strength from the base station A.

Further, when there are a number of other mobile units 2 close to the source 5 of interference, these mobile units 2 also try to start switching channels or shifting zones to the base station B, so there is the afore-said problem that normal connection for the base station B is inhibited as well.

Further, a mobile unit 2 in a waiting state receives the strong interference ($f_B$) and tries to switch channels to the same, but that channel does not contain any data, so it switches to the channel with the next highest received level ($f_A$) Since it again receives the interference ($f_B$), however, it again switches to that channel. While switching to that channel, it cannot originate or terminate calls, which poses a problem in system operation. The same applies to the other mobile units 2.

The above problems may also occur due to factors other than the source 5 of interference. For example, referring to FIG. 14, if there is a large river 6 as shown in the figure, the visibility of the base station B' in a zone 3' of the other grid of zones 4' sometimes becomes extremely good for the mobile unit 2 passing the illustrated position. At this time, the mobile unit 2 receives a strong wave from the base station B' of the other grid of zones 4' and therefore performs an operation similar to that of the case of the interference. In this case, the base station A deems the $f_B$ wave from the base station B' received by the mobile unit 2 to be from the base station B near itself and operates to switch the mobile unit 2 to the channel of the base station B. However, the mobile unit 2 strongly receives the $f_B$ of the base station B', so cannot switch channels to the base station B. The mobile unit 2 then tries to resume communication with the base station A. Normal communication is obstructed during that interval.

The present invention provides a system for monitoring carriers of peripheral zones which enables a mobile unit to perform channel switching or zone shifting free from the effect of any interference or any carrier transmitted from another grid of zones which may be deemed interference even if received at a high level of received field strength.

Figure 1:
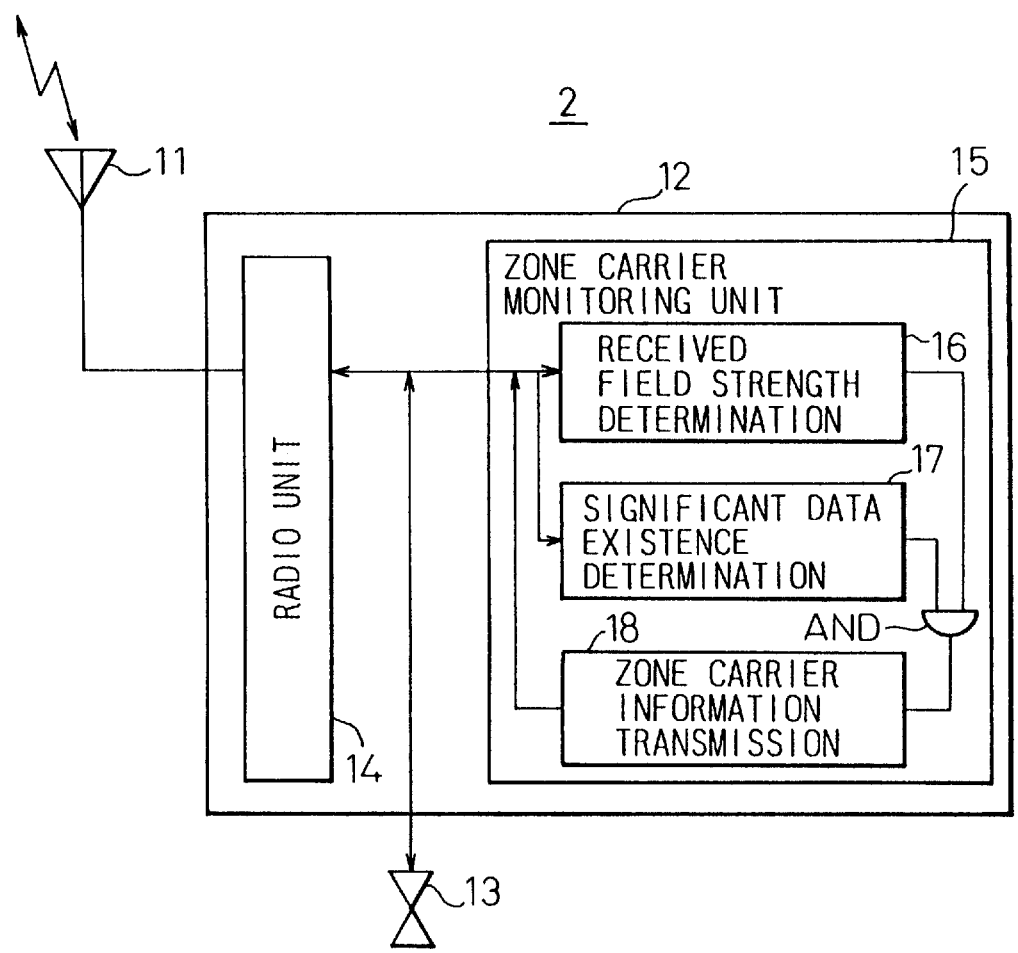
FIG. 1 is a view illustrating the principle of the system according to the present invention.

FIG. 1 is a view illustrating the principle of the system according to the present invention. In the figure, the mobile unit 2 is comprised of an antenna 11, a mobile unit body 12, and a handset 13. The mobile unit body 12 is comprised of a radio unit 13 and a control unit. The control unit is provided with various control functions, but only the zone carrier monitoring unit 15 is drawn as it relates to the present invention.

This zone carrier monitoring unit 15 is comprised of a means 16 for judging the strength of the received electric field, a means 17 for judging the existence of significant data, and a means 18 for transmitting zone carrier information. Using these means, when monitoring the carriers transmitted from the base stations in peripheral zones, the mobile unit 2 deems transmissions carriers to be true carriers received from peripheral zones 3 and monitors the same when the two conditions stand that the received field strengths of the transmission carriers are at least a certain level and that there is significant data transmitted by the transmission carriers.

According to this basic aspect of the invention, the mobile unit 2 monitors the carriers sent from the different base stations 1 in several zones and notifies this information to an engaged base station 1 for channel switching or zone shifting. At this time, not only is it judged if there is a carrier of a peripheral zone based on the received field strength of the transmission carrier, but also it is determined if there is significant data transmitted by the transmission carrier. By doing this, the possibility of mistakenly judging interference or a wave resembling the same to be a genuine carrier of a peripheral zone becomes almost zero.

Preferable embodiments are described below:

In a first embodiment, the existence of the significant data is confirmed from the data in a control channel transmitted by the transmission carriers.

In the first embodiment, therefore, use is made of the control channel to judge the existence of significant data. The data of the control channel is inherently contained in the transmission carriers.

In a second embodiment, the data in the control channel is data showing a color code CC. When the color code CC stored in a mobile unit 2 and the color code CC in the control channel transmitted by the transmission carrier match, the transmission carrier is deemed to be a true carrier received from a peripheral zone 3 and is monitored.

In a third embodiment, the data in the control channel is data showing a synchronizing word SW. When the synchronizing word SW is detected from the control channel transmitted by the received carrier in the mobile unit 2, the received carrier is deemed to be a true carrier received from a peripheral zone 3 and is monitored.

In a fourth embodiment, the data in the control channel is a control signal CAC with an error detection code. When it is decided that there is no error in the results obtained by applying a predetermined error detection operation on the control signal CAC transmitted by the received carrier in the mobile unit 2, the received carrier is deemed to be a true carrier received from a peripheral zone 3 and is monitored.

In the second, third, and fourth embodiments, note is taken of the color code CC, synchronizing word SW, and control signal CAC, in particular the error detection code added to the control signal CAC, among the data forming the control channel. All are essential data for identifying the carrier and cannot exist in interference etc.

In a fifth embodiment, data repeatedly transmitted by the carrier is received and stored a plurality of times. It is judged that there is significant data when it is confirmed that the stored sets of data match each other.

In the above embodiments, it was assumed that the data in the control channel, for example, the color code CC, synchronizing word SW, and error detection code added to the control signal CAC, were held in the memory unit in the control unit, but in the fifth embodiment, use is not made of data held in the memory unit. Rather, it is deemed that a true carrier has been received by repeatedly receiving data, storing it each time, and confirming that the different instances of data match with each other.

In a sixth embodiment, it is confirmed that there is significant data when significant data is detected a plurality of times.

In the sixth embodiment, it is deemed a true carrier has been received only after the color code CC, synchronizing word SW, etc. detected in the second to fourth embodiments are detected a plurality of times. This is in consideration of the fact that the true data may fail to be received due to fading and other effects in reception of a radio wave.

In a seventh embodiment, it is judged that the color codes CC match when it is confirmed that the color codes CC match a plurality of times.

In an eighth embodiment, it is judged that the synchronizing word SW has been detected when the synchronizing word SW is detected a plurality of times.

In a ninth embodiment, it is judged that the results obtained by applying a predetermined error detection operation on the control signal CAC match with the error detection code when it is detected a plurality of times that there is no error in the results.

In the seventh, eighth, and ninth embodiments, which are improvements of the sixth embodiment, data including the color code CC, synchronizing word SW, and control signal CAC error detection code is received a plurality of times, so reliability is increased.

In a 10th embodiment, information on the received field strength detected at the mobile unit 2 and identifying information of the base station 1 transmitting the received carrier are sent from the mobile unit 2 to the base station 1.

In an 11th embodiment, the identifying information of the base station 1 is the color code CC.

In the 10th and 11th embodiments, when the mobile unit 2 detects the color code CC, it sends it to the base station 1 together with the information on the received field strength (which carrier from which zone). This enables the base station 1 to immediately determine from which grid of zones (4, 4') the carrier is being transmitted from and enables judgement that the mobile unit is monitoring a carrier from another grid of zones deemable as interference.

In a 12th embodiment, even if a mobile unit 2 involved in a call through one of the base stations 1 detects that the received field strength of a transmission carrier is above a predetermined level, when confirming that there is no significant data in the transmission carrier, it prohibits notification of information on the received field strength to the base station 1.

In the 12th embodiment, when the mobile unit 2 is involved in a call, it periodically transmits to the base station 1 information on the carrier with the largest received field strength among the transmission carriers of the peripheral zones which it receives. If there is no significant data, however, it prohibits that transmission so the base station 1 does not switch channels.

In a 13th embodiment, even if a mobile unit 2 in a waiting state detects that the received field strength of a transmission carrier is above a predetermined level, when confirming that there is no significant data in the transmission carrier, it does not select the zone sending that transmission carrier as a candidate for zone shifting.

In the 13th embodiment, even if a mobile unit 2 in a waiting state receives a zone carrier with a high received field strength, it will not consider that zone carrier as a candidate for zone shifting unless it confirms there is significant data and therefore the mobile unit 2 is not troubled with wasteful zone shifting operations caused by interference etc.

Figure 2:
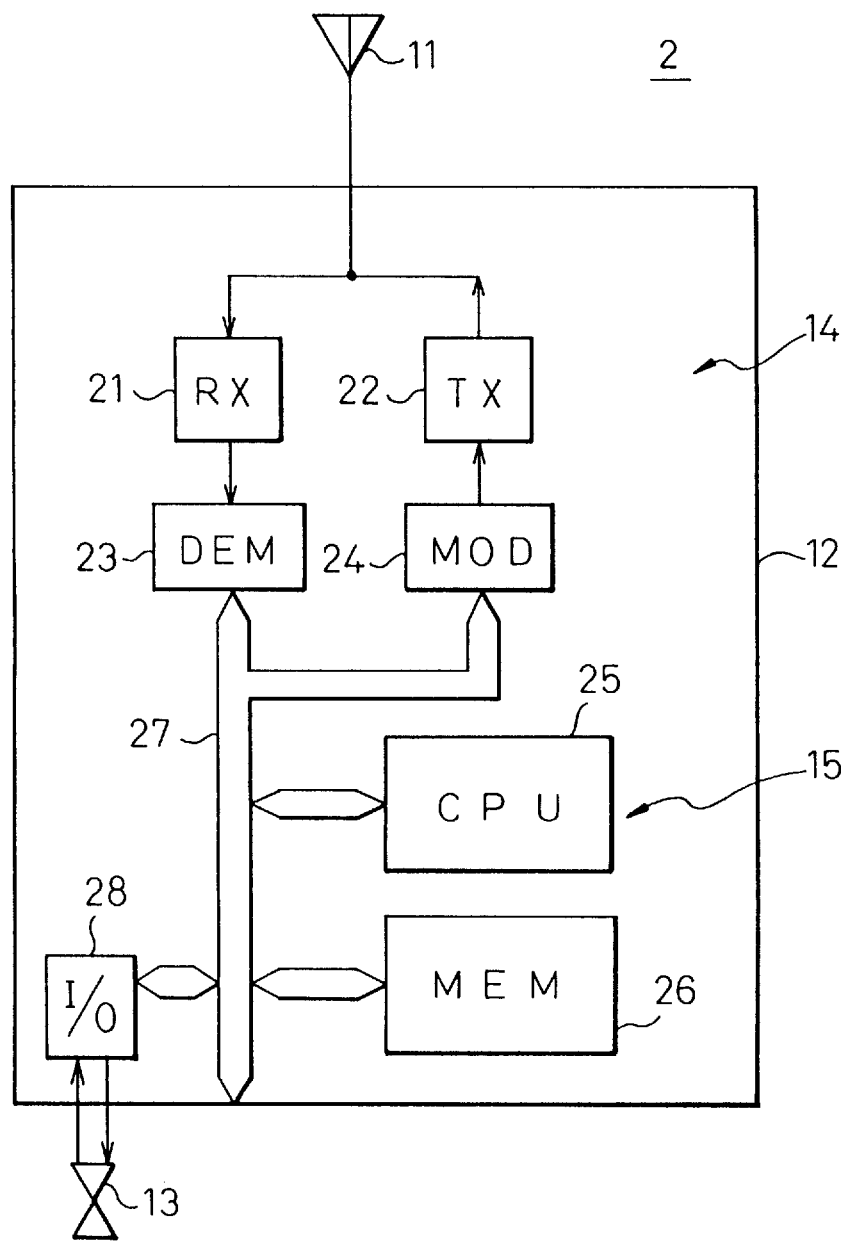
FIG. 2 is a view of an example of the configuration of a mobile unit to which the present invention is applied.

FIG. 2 is a view of an example of the configuration of a mobile unit to which the present invention is applied. In the figure, the zone carrier monitoring unit (15 in FIG. 1), which is particularly relevant to the present invention, is comprised of a central processing unit (CPU) 25 and a memory unit (MEM) 26. The central processing unit 25 and memory unit 26 are connected through a bus 27 to a radio unit (14 in FIG. 1). This radio unit 14 is comprised of a receiver (RX) 21, transmitter (TX) 22, demodulator (DEM) 23, and modulator (MOD) 24.

The radio unit 14, central processing unit 25, and memory unit 26 are connected through the bus 27 and input/output (I/O) unit 28 to the transmitter/receiver (13 of FIG. 1).

Figure 3:
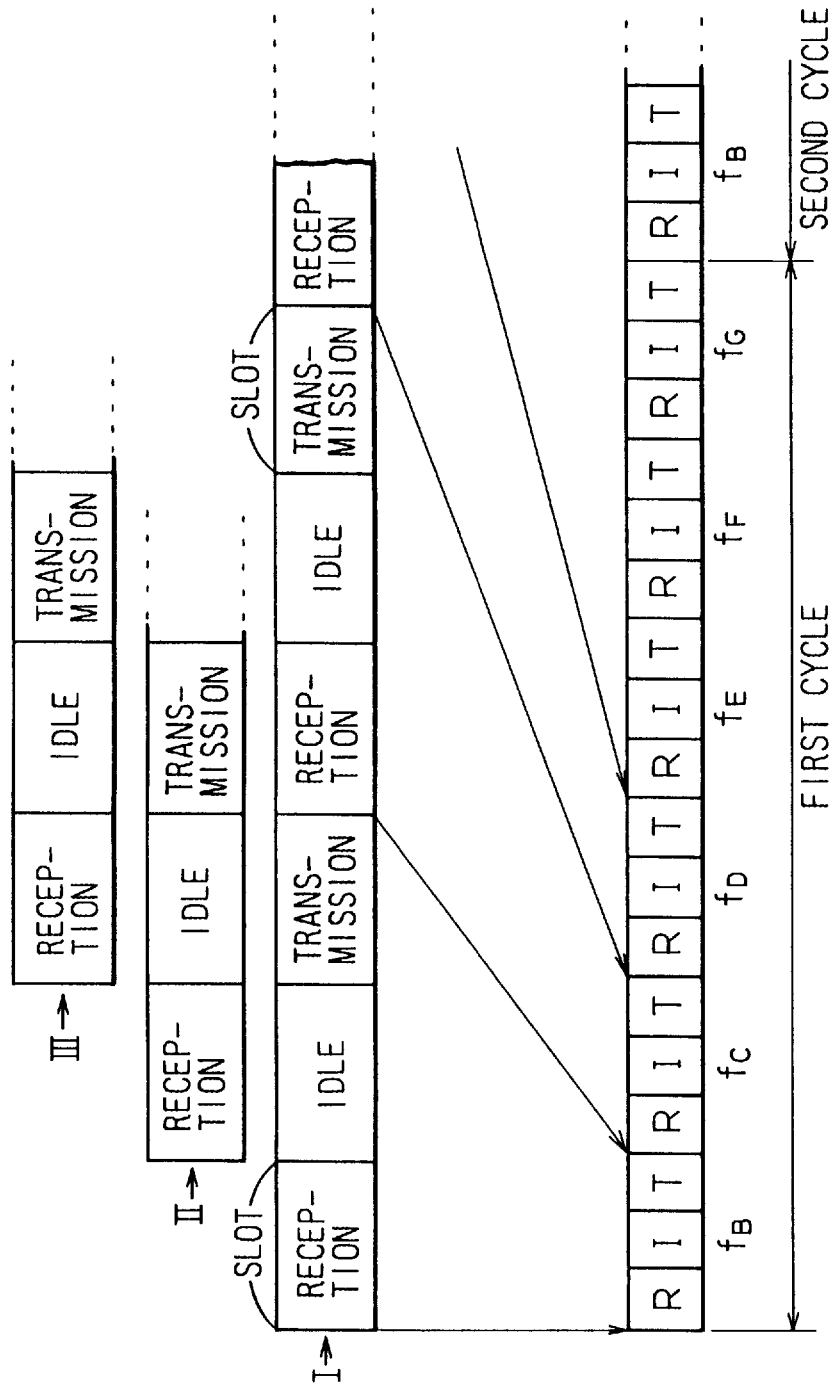
FIG. 3 is a sequence chart of an example of the TDMA control performed by a mobile unit.

FIG. 3 is a sequence chart of an example of the TDMA control performed by a mobile unit. Note that the figure shows the example of a triplex. In the figure, "RECEPTION" shows the slots for receiving a carrier (radio wave) from a base station 1, "IDLE" shows the slots for receiving carriers from peripheral zones around the mobile unit 2, and "TRANSMISSION" shows the slots for sending a carrier from the mobile unit 2 to a base station 1. These "RECEPTION", "IDLE", and "TRANSMISSION" phases are shifted one slot each from each other. The above triplex is realized using three mobile unit 2 with different phases I, II, and III as illustrated. On the other hand, a base station 1 discriminates among these three phases so as to judge which of the mobile unit among the three mobile units is engaged in a call.

In FIG. 3, the lower row shows the sequence in the case of time expansion. The above "RECEPTION" is indicated by R, "IDLE" by I, and "TRANSMISSION" by T.

In the example of FIG. 14, the mobile unit 2 is moving within a zone (frequency $f_A$) 3 belonging to the grid of zones 4. At this time, the mobile unit 2 successively monitors the carriers from the peripheral zones 3 having the frequencies $f_B$, $f_C$, $f_D$, $f_E$, $f_F$, and $f_G$ at the "IDLE" slots. More specifically, it inspects the magnitude of the received field strengths of the carriers having the frequencies $f_B$ to $f_C$.

If the quality of the communication at the frequency $f_A$ deteriorates (received field strength of the carrier ($f_A$) falls), the channel is switched to the adjoining zone 3. Assuming that the received field strength of the carrier ($f_B$) becomes relatively large, the channel is switched to the zone ($f_B$).

As explained above, the point of the invention is as follows. That is, when monitoring the carriers transmitted from the base stations 1 in peripheral zones 3, the mobile units 2 deem transmission carriers to be true carriers received from peripheral zones 3 and monitor the same when the two conditions stand that the received field strengths of the transmission carriers are at least a certain level and that there is significant data transmitted by the transmission carriers. In this case, the significant data need only be enough to confirm that the transmission carrier is not interference etc. It is possible to confirm this by adding a simple ID showing that the carrier is not interference to the transmission carriers in advance and checking those IDs. In practice, however, it is effective to use data in the control channel, originally included in a transmission carrier, as the significant data.

Figure 4:
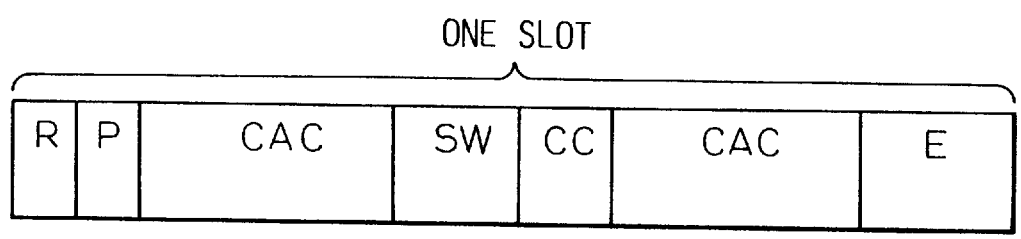
FIG. 4 is a view of an example of the configuration of a control channel sent from a base station.

FIG. 4 is a view of an example of the configuration of a control channel sent from a base station. The data in the control channel sent by the transmission carrier from the base station 1 is, for example, as illustrated, comprised of the groups of bits R, P, CAC, SW, CC, CAC, and E. The meanings of these groups of bits are as follows:

R is a guard time for transitional response to a burst. P is a preamble. CAC is a control signal and includes PCH (simultaneous call up channel data), BCCH (broadcasting channel data), and SCCH (individual cell use channel data). Note that the data usually has an error detection code (cyclic redundancy check (CRC) etc.) attached. SW is a synchronizing word and is used for synchronous detection. It is a fixed value for the system as a whole. CC is a color code which acts as identifying information showing to which grid of zones among the engaged grid of zones 4 and plurality of other grids of zones 4' shown in FIG. 14 the base station belongs. E shows collision control bits.

In the present invention, note is particularly taken of the color code CC, synchronizing word SW, and control signal CAC among this data.

Regarding the color code CC, when the color code CC stored in the mobile unit 2 and the color code CC in the control channel transmitted by the received carrier match, the received carrier is deemed to be a true carrier received from a peripheral zone 3 and is monitored. The color code CC is stored by the memory unit 26 shown in FIG. 2.

Regarding the synchronizing word SW, when the synchronizing word (SW) is detected from the control channel sent by the received carrier in the mobile unit 2, the received carrier is deemed to be a true carrier received from a peripheral zone 3 and is monitored. This synchronizing word SW is also stored in the memory unit 26.

Regarding the control code CAC, the data in the control channel is made the control signal CAC with an error detection code. When it is decided that there is no error in the results obtained by applying a predetermined error detection operation on the control signal CAC sent by the received carrier in the mobile unit, the received carrier is deemed to be a true carrier received from a peripheral zone and is monitored. In this case, use is made for example of a cyclic redundancy check CRC as the error detection code. It is possibhle to apply a predetermined error detection operation, that is, division by a CRC polynomial, to the bit train of the control signal CAC received and if dividable the received carrier deemed to be not interference etc.

Figure 5:
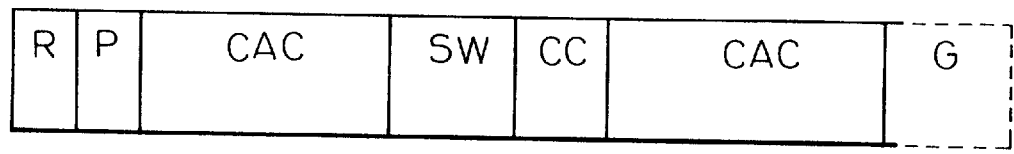
FIG. 5 is a view of an example of the configuration of a control channel sent from a mobile unit.

The format in FIG. 4 showed a control channel sent by a carrier from a base station. FIG. 5 shows an example of the configuration of a control channel sent from a mobile unit. The difference from FIG. 4 is that there are the G bits instead of the E bits in FIG. 4. The G bits indicate the guard time.

The formats of the signals during a call differ in the case of FIG. 4 and FIG. 5. Examples are shown in FIG. 6 and FIG. 7.

FIG. 6 is a view of an example of the configuration of a speech channel sent from a mobile unit during a call, while FIG. 7 is a view of an example of the configuration of a speech channel sent from a base station during a call. In FIG. 6, TCH is the user information transfer use data, while the parenthesized FACCH shows fast ACCH (attached control channel) data. SF is the still flag (1 bit). SACCH is a slow ACCH (attached control channel) data. Note that the parenthesized RCH shows the housekeeping data.

Of the above data, TCH is the channel for transferring the speech data for the call. Commands for switching channels during a call and information on the received field strengths of the carriers from the peripheral zones, related to the invention, are transmitted through the above control channel SACCH or FACCH.

In the above monitoring of carriers, the data (CC or SW) is held in the memory unit 26 of FIG. 2 and that data is compared with the data contained in the currently received carrier. There are other methods of comparison, however. Specifically, there is the method of receiving and storing several times the data repeatedly sent by a transmission carrier and judging that there is significant data when confirming that the different instances of data stored match each other. This takes note of the fact that if data is sent from a true peripheral zone, the different instances of data will not change, but the same data will be repeatedly received.

In the above monitoring of carriers, it was judged that a true carrier was monitored when data (CC or SW) was detected once, but more preferably it is judged that a true carrier is monitored when the data (CC or SW) is detected two or more times. This is because the mobile unit 2 may fails in one detection operation due to the effects of fading etc. Conversely, it may receive transitory interference and fail in detection. Accordingly, as mentioned above, the mobile unit confirms the existence of the significant data when detecting the significant data a plurality of times. Further, it judges that the color codes CC match when confirming the color codes CC match a plurality of times. Still further, it judges that there is no error when detecting several times that there is no error in the results obtained by applying a predetermined error detection operation on the control signal CAC.

Figure 8:
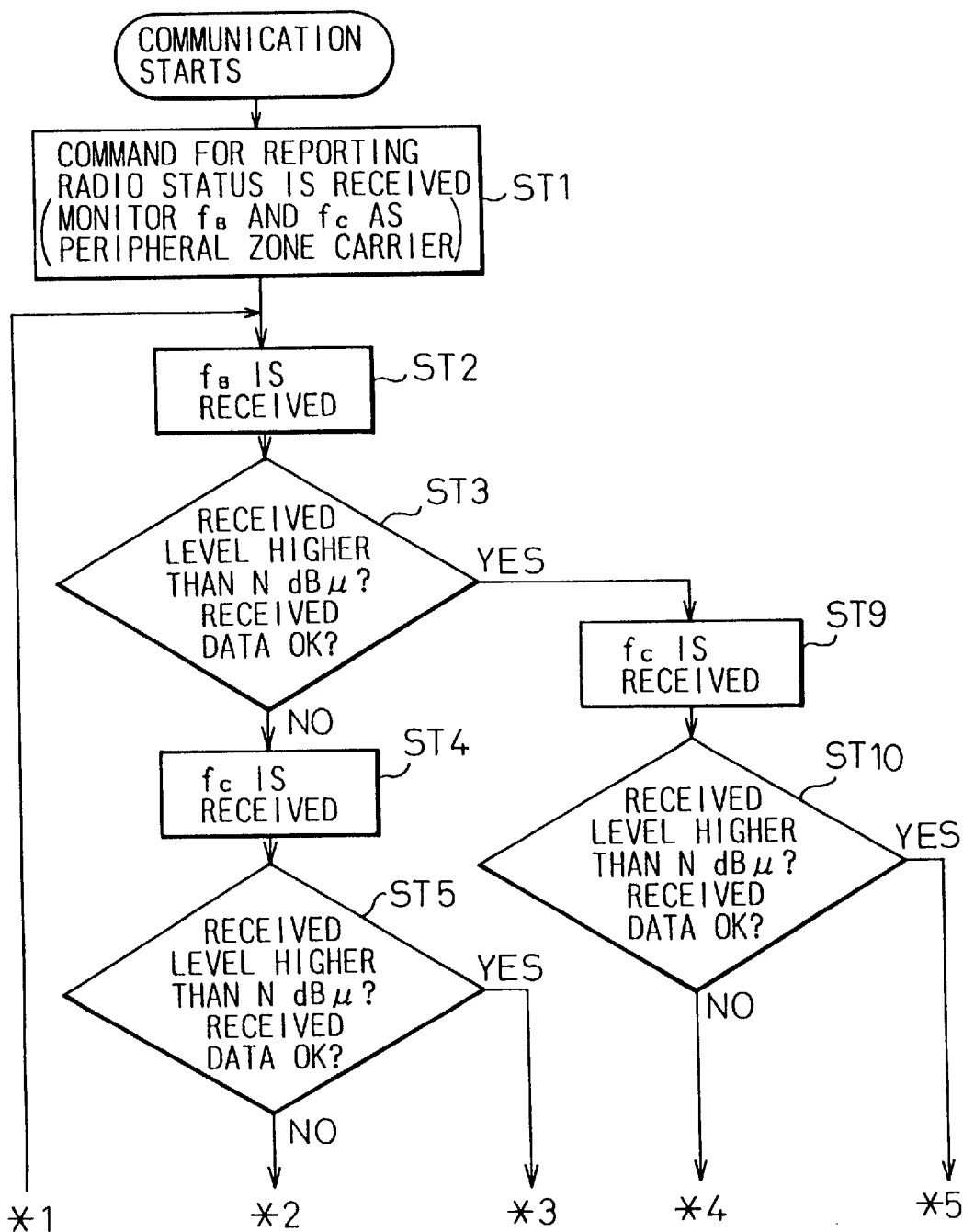
FIG. 8 is part of a flow chart of an example of the routine for monitoring carriers of peripheral zones in a mobile unit.
Figure 9:
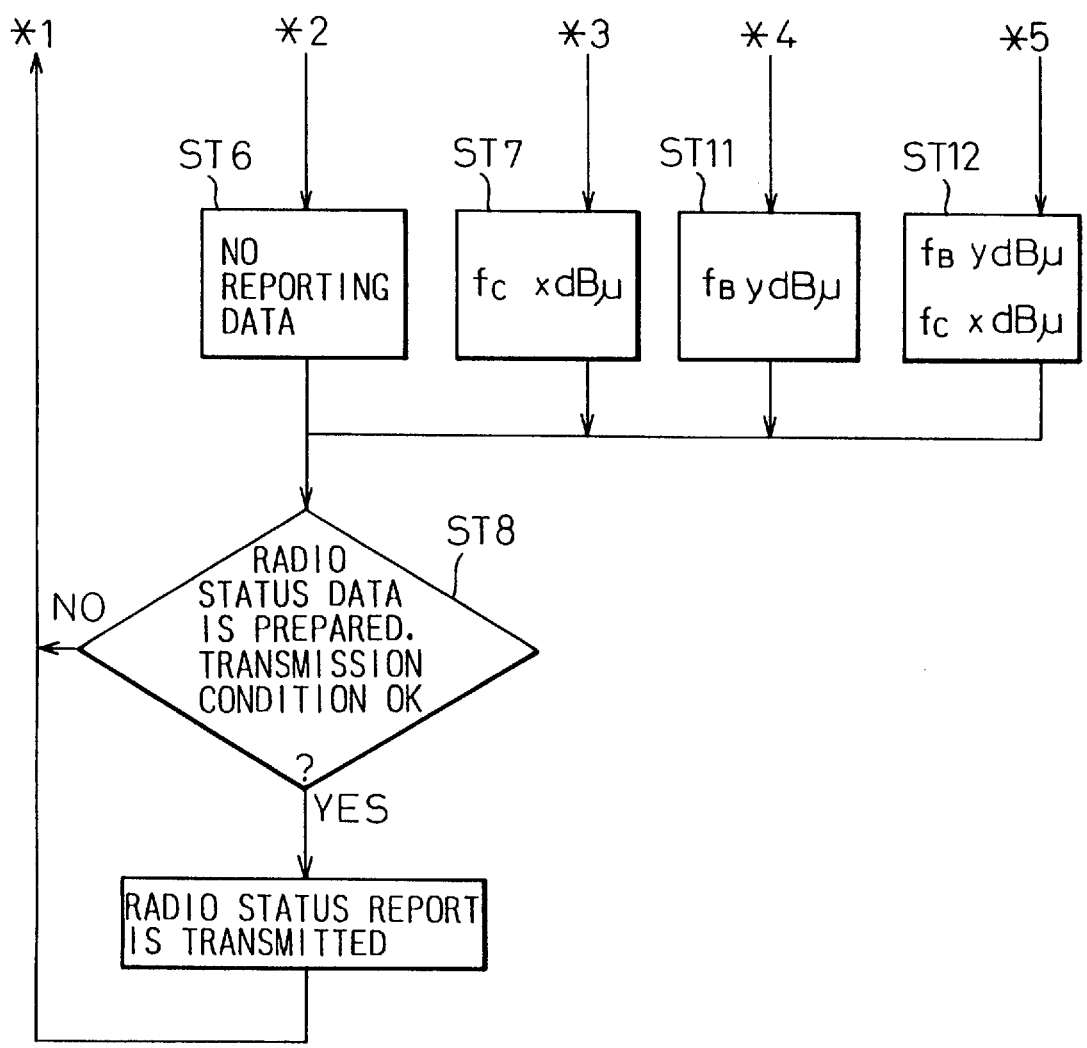
FIG. 9 is another part of a flow chart of an example of the routine for monitoring carriers of peripheral zones in a mobile unit.

FIG. 8 is first part of a flow chart of an example of the routine for monitoring carriers of peripheral zones in a mobile unit; while FIG. 9 is a second part. For example, when a mobile unit 2 in a zone ($f_A$) 3 shown in FIG. 14 is involved in a call through a base station A, the base station A commands the mobile unit 2 to monitor the carriers from the peripheral zones ($f_B$ or $f_C$) through the attached control channel (SACCH or FACCH in FIG. 7) while engaged in the call. In response to this command, the mobile unit 2 sends a radio status report to the base station A through the attached control channel (SACCH or FACCH in FIG. 6). The flow of transmission itself is known, but the present invention newly adds the routine for judging "received data OK" at step ST3, ST5, and ST10. This "received data OK" corresponds to "there is significant data sent by the carrier" as mentioned earlier. By adding this routine, it becomes possible to forestall mistaken activation of a channel switching operation with respect to the base station 1 by a mobile unit 2 receiving interference. The steps of FIG. 8 and FIG. 9 are explained below.

Step 1 (ST1)

The mobile unit 2 receives a command from the base station A to report the radio status. The command indicates, for example, to "monitor the carrier frequencies $f_B$ and $f_C$ as carriers of peripheral zoness".

Step 2 (ST2)

The mobile unit 2 obeys the command and receives the peripheral carrier $f_B$ at an idle time (see FIG. 3).

Step 3 (ST3)

It judges that the level of the received field strength of $f_B$ is higher than a predetermined level (for example, NdB$\mu$). It then investigates if the data in the received carrier ($f_B$) is the above-mentioned significant data (received data OK?).

Step 4 (ST4)

If the received level did not exceed the predetermined level at step 3, of course, and if it did exceed the predetermined level, but the received data was not significant data, then routine proceeds to step 4, where the mobile unit 2 receives the carrier ($f_C$) of another designated peripheral zone at an idle time.

Step 5 (ST5)

At step 5, the mobile unit 2 performs the same judgement as at step 3 (ST3) for the carrier of the other peripheral zone ($f_C$).

Step 6 (ST6) (see FIG. 9)

If both the two conditions of the received level being OK and the received data being OK are not satisfied at step 5, then the mobile unit 2 has no data to report in the report of radio status to the base station A.

Step 7 (ST7)

If the two conditions are simultaneously satisfied at step 5, the mobile unit 2 records the received field strength of the carrier of the peripheral zone ($f_C$) at that time, for example, xdB$\mu$, in part of the memory unit 26 as report data.

Step 8 (ST8)

The mobile unit 2 then prepares data of the radio status report, including the report data (xdB$\mu$) at step 7 (ST7) and confirms that the conditions for transmission at the "TRANSMISSION" phase of FIG. 3 are OK.

Turning to FIG. 9,

Step 9 (ST9)

If the mobile unit 2 judged at step 3 that both the conditions of the received level and received data of the carrier of the peripheral zone ($f_B$) were satisfied, it then monitors the next designated carrier of a peripheral zone ($f_C$). For this purpose, it receives the carrier ($f_C$) at an idle time of FIG. 2.

Step 10 (ST10)

The mobile unit 2 performs the same judgement as at step 3 (ST3) for the carrier of the peripheral zone ($f_C$) received at step 9.

Step 11 (ST11)

If both of the received level and received data conditions are not satisfied at step 10, the mobile unit 2 records the received field strength of the carrier of peripheral zone ($f_B$) which did satisfy the two conditions before, for example, ydB$\mu$, in part of the memory unit 26 as report data.

Step 12 (ST12)

If both of the received level and received data conditions are satisfied at step 10, the mobile unit 2 records the received field strength (xdB$\mu$) of the carrier of the peripheral zone (f$_C$) judged to be OK along with the received field strength (ydB$\mu$) of the carrier of peripheral zone (f$_B$) which satisfied the two conditions before in part of the memory unit 26 as report data.

Step 13 (ST13)

The mobile unit 2 confirms that the transmission conditions were OK at step 8 (ST8), then sends the radio status report to the base station A.

FIG. 10 is a view for explaining a report of radio status. FIGS. 8 and 9 show an example of the flow of preparation of the radio status report, but FIG. 10 shows an example of the format. The radio status report itself is a general one, but is further modified in FIG. 10 in accordance with the present invention. That is, together with the information of the received field strength detected by the mobile unit 2, identifying information of the base station sending the received carrier is sent from the mobile unit 2 to the base station 1. This is given as the "IDENTIFICATION DATA OF BASE STATION" in the figure.

In FIG. 10, f$_1$ is the frequency of a carrier of a peripheral zone having a first level of reception. This is the largest level of reception. The level of reception becomes lower in the subsequent order of f$_2$ to f$_N$. The radio status report is periodically sent from the mobile unit 2 to the base station (f$_A$) 1 while the mobile unit 2 is involved in a call. Note that the "MESSAGE CLASSIFICATION" at the top of the figure indicates a report of radio status. The "NUMBER OF SELECTED ZONES" indicates how many (for example, 20) of the approximately 80 perch channels are being reported on.

FIG. 11 is a view of a specific example of a report of radio status shown in FIG. 10. That is, the base station identifying data shown in FIG. 10 is specifically the perch channel number and the color code as an example. The point is the introduction of the color code. The perch channel number is a number individually assigned to each of the approximately 80 types of frequencies (perches) selected in the range of center frequencies, for example, 821.500 MHz to 823.475 MHz, resistant to interference with other radio communication networks out of the range of frequencies allocated to the radio communication network as a whole, for example, 818.050 MHz to 825.950 MHz, and is stored in the memory unit 26 of FIG. 2. The mobile unit 2 reads out the perch channel numbers from the memory unit (MEM) 26 of FIG. 2 each time its power is turned on and searches for the received carriers corresponding to those numbers. The mobile unit 2 selects the retrieved perch channel (frequency) with the highest level of reception (received field strength) and starts the communication. Further, it receives broadcasting information from the control channel of the base station 1 of the highest level of reception. That broadcasting information contains perch channel numbers sent by the peripheral base station 1. The mobile unit 2 monitors the levels of the peripheral base stations during a waiting operation based on these perch channel numbers.

Figure 12:
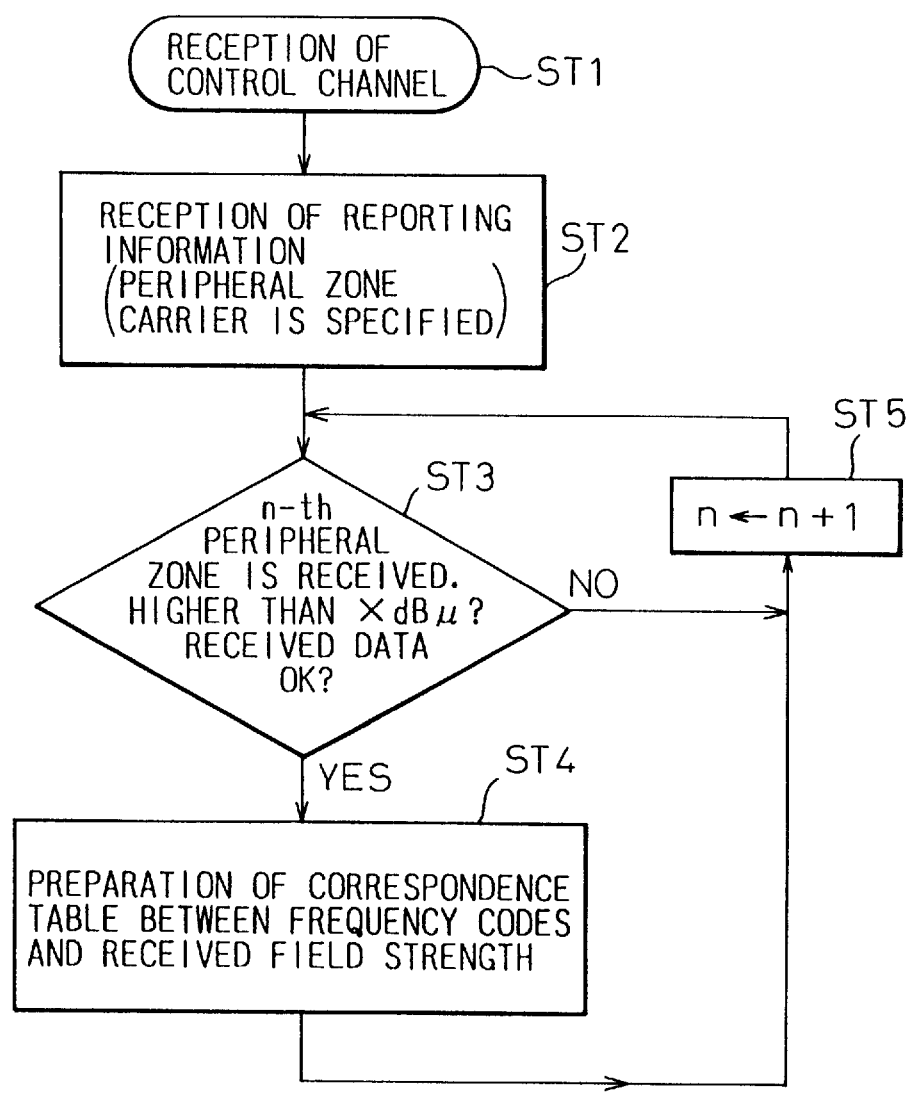
FIG. 12 is a flow chart of a routine for preparing a table at the time of shifting to a peripheral zone in the mobile unit.

The flow of processing of FIG. 8 and FIG. 9 shown above related to processing by the mobile unit while involved in a call. The processing of the mobile unit when standing by to engage in a call is explained below:

FIG. 12 is a flow chart of a routine in a mobile unit for preparing a table at the time of peripheral zone shifting. This routine for preparing a table is one of the important processing operations performed by the mobile unit in a waiting state. The flow shown in the figure is itself known, but has been modified in the present invention by the addition of step 3 (ST3) of determination if there is received data. That is, even if a mobile unit 2 in a waiting state detects that the received field strength of a transmission carrier is over a certain level, if confirming that there is no significant data in the transmission carrier, it does not select the zone 3 sending the transmission carrier as a candidate for zone shifting.

Step 1 (ST1)

When the power is turned on, the mobile unit 2 receives a control channel (FIG. 4) from the nearest base station (f$_A$).

Step 2 (ST2)

The mobile unit 2 receives broadcasting information from the BCCH (broadcast channel data) included in the control signal CAC in the control channel received at step 1. This broadcasting information designates the peripheral zones 3 to be monitored by the mobile unit 2. For example, the peripheral zones (f$_B$, f$_C$ etc.) in FIG. 14 are designated.

Step 3 (ST3)

If there are n number (n=2, 3, 4 . . . ) of peripheral zones designated at step 2, the mobile unit 2 successively receives the carriers of the first, second . . . n-th peripheral zones and investigates if the received levels (received field strength) are higher than a certain level (for example, xdB$\mu$).

At the same time, further, it investigates if the data sent by the transmission carrier from each of the peripheral zones is significant data (received data OK?).

Step 4 (ST4)

If both the received level and the received data are OK at step 3, the mobile unit 2 prepares a table of correspondence between the frequency codes (carrier frequencies of designated zones) and the corresponding received field strengths.

Step 5 (ST5)

The mobile unit 2 prepares a correspondence table for the first, second . . . n-th peripheral zones. Note that when the number (n) of peripheral zones designated at step 2 is exceeded, n is returned to zero and a similar operation is repeated from the first zone.

Accordingly, the mobile unit 2 keeps updating the table, decides on the peripheral zone with the highest level of reception from it, and shifts zones.

Figure 13:
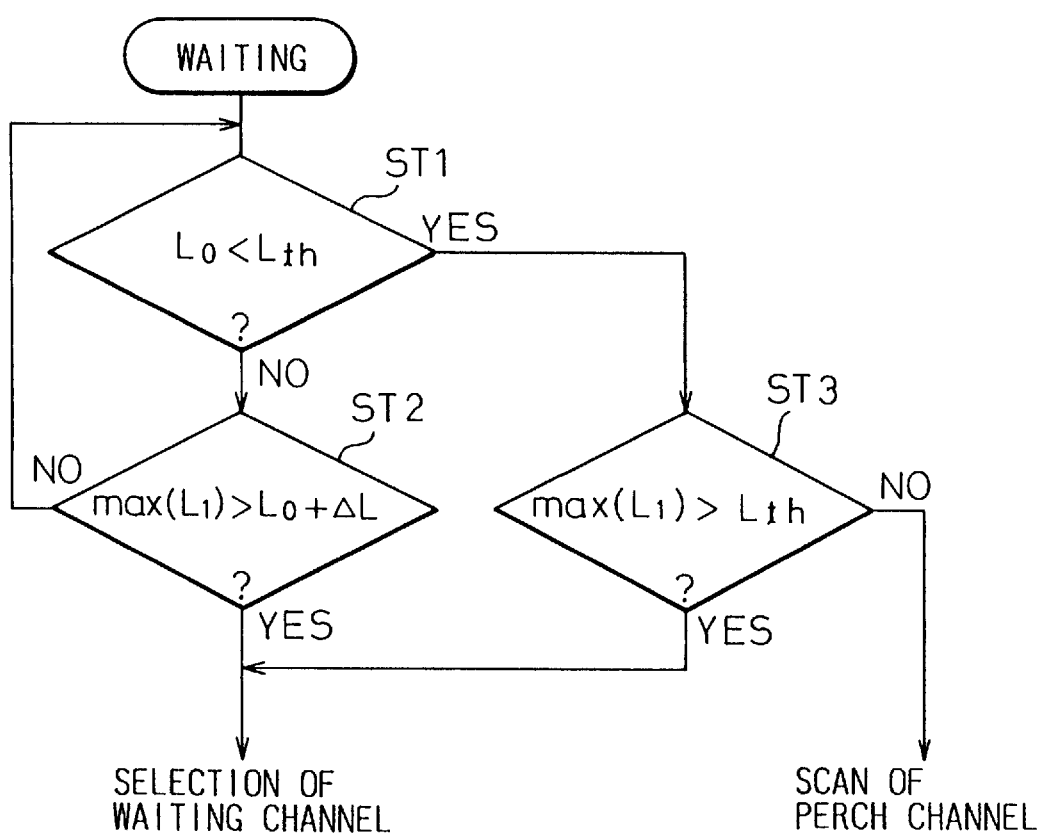
FIG. 13 is a flow chart explaining details of step 4 in FIG. 12.

FIG. 13 is a flow chart explaining details of step 4 in FIG. 12.

Step 1 (ST1)

L$_o$ is the level of reception (received field strength) at an engaged zone (f$_A$). L$_{th}$ is the waiting deterioration level. If L$_o$<L$_{th}$, the level of reception of the engaged zone has not deteriorated and the mobile unit 2 can remain in its waiting state as is.

Step 2 (ST2)

L$_i$ shows levels of reception of a designated plurality of peripheral zones. L$_i$=L$_1$, L$_2$, L$_3$ . . . L$_n$. The maximum level of reception among these is indicated by max(L$_i$). In this case, L$_i$ is not all of L$_1$ to L$_n$. Only the ones of "received data OK" at step 3 of FIG. 12 are extracted.

Here, $\Delta$L is the zone shift level difference. $\Delta$L is greater than (L$_m$−L$_{th}$). L$_m$ shows the waiting allowable level. Therefore, when max(L$_i$)>L$_o$+$\alpha$L stands, the mobile unit 2 shifts zones selecting the carrier of the peripheral zone corresponding to the max(L$_i$) as the waiting channel. For example, if f$_B$ (=max(L$_i$)) becomes larger than the level of reception (L$_o$) of f$_A$ plus 6 dB ($\Delta$L), the mobile unit 2 switches the waiting channel to f$_B$.

Step 3 (ST3)

Even when $\max(L_i)>L_m$ stands, the mobile unit 2 selects the carrier of the peripheral zone corresponding to this $\max(L_i)$ as the waiting channel.

On the other hand, when $\max(L_i)>L_m$ does not stand, the mobile unit 2 is considered to have left the zone and therefore starts the scan of the perches once again. That is, it reconfigures the correspondence table. For example, the mobile unit 2 reconfigures the table when it enters a building where radio waves cannot penetrate.

As explained above, according to the present invention, there is no longer any mistaking of interference or a wave arriving jumping over zones and deemable as interference as a normal carriers of peripheral zones. As a result, it becomes possible to accurately switch channels and shift zones and thereby possible to improve the efficiency of operation of the mobile telecommunications system.

I claim:

1. A system for monitoring carriers of peripheral zones in a mobile telecommunication system having a plurality of base stations using allocated carriers mutually differing frequencies, a plurality of grids of small service zones formed by a collection of a plurality of zones each having its own base station, and a plurality of mobile units which communicate under TDMA control with base stations selected by monitoring whether received carriers are true carriers provided in these grids of zones or a false carrier radiated from a source of interference which might cause erroneous channel switching or zone shifting in said mobile telecommunication system, wherein when monitoring the carriers transmitted from the base stations in peripheral zones, the mobile units deem transmission carriers to be true carriers received from peripheral zones and monitors the transmission carriers when received field strengths of the transmission carriers are at least a predetermined level and significant data is transmitted by the transmission carriers, existence of the significant data being confirmed from data in a control channel transmitted by the transmission carriers, the data in the control channel being data showing a color code, when a color code stored in a mobile unit and the color code in the control channel transmitted by the transmission carrier match, the transmission carrier is deemed to be a true carrier received from a peripheral zone and is treated as one of candidates of carriers to be monitored by the mobile unit the transmission carrier is deemed to be not a true carrier received from a peripheral zone and is not treated as the one of candidates of carriers to be monitored by the mobile unit if the two color codes do not match even though the received field strengths of the carriers are at least the predetermined level.

2. A system for monitoring carriers of peripheral zones as in claim 1, wherein it is judged that the color codes match when it is confirmed that the color codes match a plurality of times.

3. A system for monitoring carriers of peripheral zones as in claim 1, wherein information on the received field strength detected at the mobile unit and identifying information of the base station transmitting the received carrier, are sent from the mobile unit to the base station.

4. A system for monitoring carriers of peripheral zones as in claim 3, wherein the identifying information of the base station is the color code.

5. A system for monitoring carriers of peripheral zones as in claim 1, wherein even if a mobile unit involved in a call through one of the base stations detects that the received field strength of the transmission carrier is above said predetermined level, when confirming that there is no significant data in the transmission carrier, prohibits notification of information on the received field strength to the base station.

6. A system for monitoring carriers of peripheral zones as in claim 1, wherein even if a mobile unit in a waiting state detects that the received field strength of a transmission carrier is above said predetermined level, when confirming that there is no significant data in the transmission carrier, said mobile unit does not select the zone sending that transmission carrier as a candidate for zone shifting.

7. A system for monitoring carriers of peripheral zones in a mobile telecommunication system having a plurality of base stations using allocated carriers of mutually differing frequencies, a plurality of grids of small service zones formed by a collection of a plurality of zones each having its own base station, and a plurality of mobile units which communicated under TDMA control with base stations selected by monitoring whether the received carriers are true carriers provided in these grids of zones or a false carrier radiated from a source of interference which might cause erroneous channel switching or zone shifting in said mobile telecommunication system, wherein when monitoring the carriers transmitted from the base stations in peripheral zones, the mobile units deem transmission carriers to be true carriers received from peripheral zones and monitor the transmission carriers when received field strengths of the transmission carriers are at least a predetermined level and significant data is transmitted by the transmission carriers, existence of the significant data being confirmed from data in a control channel transmitted by the transmission carriers, and the data in the control channel being data showing a synchronizing word, and when in the mobile unit the synchronizing word is detected from the control channel transmitted by the received carrier, the received carrier is deemed to be a true carrier received from a peripheral zone, and is treated as one of candidates of carriers to be monitored by the mobile unit, the transmission carrier is deemed to be not a true carrier received from a peripheral zone and is not treated as the one of candidates of carriers to be monitored by the mobile unit if the two color codes do not match even though the received field strengths of the carriers are at least the predetermined level.

8. A system for monitoring carriers of peripheral zones as in claim 7, wherein it is judged that the synchronizing word has been detected when the synchronizing word is detected a plurality of times.

9. A system for monitoring carriers of peripheral zones as in claim 7, wherein even if a mobile unit involved in a call through one of the base stations detects that the received field strength of the transmission carrier is above said predetermined level, when confirming that there is no significant data in the transmission carrier, prohibits notification of information on the received field strength to the base station.

10. A system for monitoring carriers of peripheral zones as in claim 7, wherein even if a mobile unit in a waiting state detects that the received field strength of a transmission carrier is above said predetermined level, when confirming that there is no significant data in the transmission carrier, said mobile unit does not select the zone sending that transmission carrier as a candidate for zone shifting.

11. A system for monitoring carriers of peripheral zones in a mobile telecommunication system having a plurality of base stations using allocated carriers of mutually differing frequencies, a plurality of grids of small service zones formed by a collection of a plurality of zones each having its own base station, and a plurality of mobile units which communicate under TDMA control with base stations selected by monitoring whether the received carriers are true carriers provided in these grids of zones or a false carrier radiated from a source of interference which might cause erroneous channel switching or zone shifting in said mobile telecommunication system, wherein when monitoring the carriers transmitted from the base stations in peripheral zones, the mobile units deem transmission carriers to be true carriers received from peripheral zones and monitor the transmission carriers when received field strengths of the transmission carriers are at least a predetermined level and significant data is transmitted by the transmission carriers, the existence of the significant data being confirmed from data in a control channel transmitted by the transmission carriers, and the data in the control channel being a control signal with an error detection code and when it is decided in the mobile unit that there is no error in the results obtained by applying a predetermined error detection operation on the control signal transmitted by the received carrier, the received carrier is deemed to be a true carrier received from a peripheral zone, and is is treated as one of candidates of carriers to be monitored by the mobile unit, the transmission carrier is deemed to be not a true carrier received from a peripheral zone and is not treated as the one of candidates of carriers to be monitored by the mobile unit if the two color codes do not match even though the received field strengths of the carriers are at least the predetermined level.

12. A system for monitoring carriers of peripheral zones as in claim 11, wherein it is judged that the results, obtained by applying a predetermined error detection operation on the control signal CAC, match with the error detection code, when said error detection code is detected a plurality of times, that there is no error in the results.

13. A system for monitoring carriers of peripheral zones as in claim 11, wherein even if a mobile unit involved in a call through one of the base stations detects that the received field strength of the transmission carrier is above said predetermined level, when confirming that there is no significant data in the transmission carrier, said mobile unit prohibiting notification of information on the received field strength to the base station.

14. A system for monitoring peripheral zone carriers as in claim 11, wherein a mobile unit in a waiting state detects that the received field strength of a transmission carrier is above said predetermined level, and confirms that no significant data is in the transmission carrier, said mobile unit does not select the zone sending that transmission carrier as a candidate for zone shifting.

15. A system for monitoring carriers of peripheral zones in a mobile telecommunication system having a plurality of base stations using allocated carriers of mutually differing frequencies, a plurality of grids of small service zones formed by a collection of a plurality of zones each having its own base station, and a plurality of mobile units which communicate under TDMA control with base stations selected by monitoring whether the received carriers are true carriers provided in these grids of zones or a false carrier radiated from a source of interference which might case erroneous channel switching or zone shifting in said mobile telecommunication system, wherein when monitoring the carriers transmitted from the base stations in peripheral zones, the mobile units deem transmission carriers to be true carriers received from peripheral zones and monitor the transmission carriers when received filed strengths of the transmission carriers are at least a certain level and there is significant data transmitted by the transmission carriers, and data repeatedly transmitted by a transmission carrier is received and stored a plurality of times and it is judged that there is significant data when it is confirmed that he stored sets of data match each other, a transmission carrier is deemed to be true carrier and is treated as one of candidates of carries to be monitored by a mobile unit if the stored sets of data match each other, the transmission carrier is deemed not to be true carrier received from a peripheral zone and is not treated as one of candidates of carriers to be monitored by the mobile unit if the stored sets of data do not match even though the received field strengths of the carriers are at least the certain level.

16. A system for monitoring carriers of peripheral zones as set forth in claim 15, wherein even if a mobile unit involved in a call through one of the base stations detects that the received field strength of the transmission carrier is above a predetermined level, when confirming that there is no significant data in the transmission carrier, prohibits notification of information on the received field strength to the base station.

17. A system for monitoring peripheral zone carriers as set forth in claim 15, wherein even if a mobile unit in a waiting state detects that the received field strength of a transmission carrier is above a predetermined level, when confirming that there is no significant data in the transmission carrier, it does not select the zone sending that transmission carrier as a candidate for zone shifting.

18. A system for monitoring carriers of peripheral zones in a mobile telecommunication system having a plurality of base stations using allocated carriers of mutually differing frequencies, a plurality of grids of small service zones formed by a collection of a plurality of zones each having its own base station, and a plurality of mobile units which communicate under TDMA control with base stations selected by monitoring whether the received carriers are true carriers provided in these grids of zones or a false carrier radiated from a source of interference which might cause erroneous channel switching or zone shifting in said mobile telecommunication system, wherein when monitoring the carriers transmitted from the base stations in peripheral zones, the mobile units deem transmission carriers to be true carriers received from peripheral zones and monitor the transmission carriers when received field strengths of the transmission carriers are at least a certain level and there is significant data transmitted by the transmission carriers, the existence of the significant data is confirmed from the data in a control channel transmitted by the transmission carriers, and it is confirmed that there is significant data when significant data is detected a plurality of times, a transmission carrier is deemed to be a true carrier and is treated as one of candidates of carriers to be monitored by a mobile unit if the significant data is detected a plurality of times, the transmission carrier is deemed to be not a true carrier received from a peripheral zone and is not treated as the one of candidates or carriers to be monitored by the mobile unit if the significant data is not detected a plurality of times even though the received field strengths of the carriers are at least the certain level.

19. A system for monitoring carriers of peripheral zones as set forth in claim 18, wherein even if a mobile unit involved in a call through one of the base stations detects that the received field strength of the transmission carrier is above a predetermined level, when confirming that there is no significant data in the transmission carrier, prohibits notification of information on the received field strength to the base station.

20. A system for monitoring peripheral zones as set forth in claim 18, wherein even if a mobile unit in a waiting state detects that the received field strength of a transmission carrier is above a predetermined level, when confirming that there is no significant data in the transmission carrier, it does not select the zone sending that transmission carrier as a candidate for zone shifting.

* * * * *